United States Patent
Wall et al.

(10) Patent No.: US 8,062,140 B2
(45) Date of Patent: Nov. 22, 2011

(54) POWER TRANSMISSION LINE SECTION

(76) Inventors: Kevin W. Wall, Evansville, WY (US); Jeremy S. Nicely, Casper, WY (US)

(*) Notice: Subject to any disclaimer, the term of this patent is extended or adjusted under 35 U.S.C. 154(b) by 544 days.

(21) Appl. No.: 12/156,417

(22) Filed: Jun. 2, 2008

(65) Prior Publication Data

US 2009/0298597 A1 Dec. 3, 2009

(51) Int. Cl.
*F16D 3/223* (2006.01)
*E21B 4/02* (2006.01)

(52) U.S. Cl. ............................ 464/152; 464/7; 175/107

(58) Field of Classification Search ............ 464/19, 464/106, 147, 150, 152, 155, 7, 15, 81–83, 464/139–141, 16, 153; 277/338, 353, 603, 277/634, 635, 606–609; 175/107

See application file for complete search history.

(56) References Cited

U.S. PATENT DOCUMENTS

| | | | | |
|---|---|---|---|---|
| 2,809,504 A * | 10/1957 | Erish | ............................ | 464/141 |
| 4,357,810 A * | 11/1982 | Kumpar | ............................ | 464/8 |
| 4,549,872 A * | 10/1985 | Kumpar | ............................ | 464/141 |
| 4,646,856 A | 3/1987 | Dismukes | ............................ | 175/107 |
| 4,697,638 A | 10/1987 | Knight | ............................ | 166/65.1 |
| 4,772,246 A | 9/1988 | Wenzel | ............................ | 464/117 |
| 5,000,723 A | 3/1991 | Livingstone | ............................ | 464/140 |
| 5,048,622 A | 9/1991 | Ide | ............................ | 175/107 |
| 5,069,298 A | 12/1991 | Titus | ............................ | 175/107 |
| 5,097,902 A | 3/1992 | Clark | ............................ | 166/187 |
| 5,163,521 A | 11/1992 | Pustanyk et al. | ............................ | 175/40 |
| 5,195,754 A | 3/1993 | Dietle | ............................ | 277/336 |
| 5,248,204 A | 9/1993 | Livingston et al. | ............................ | 384/97 |
| 5,267,905 A | 12/1993 | Wenzel et al. | ............................ | 464/140 |
| 5,337,840 A | 8/1994 | Chancey et al. | ............................ | 175/107 |
| 5,350,242 A | 9/1994 | Wenzel | ............................ | 384/97 |
| 5,368,108 A | 11/1994 | Aldred et al. | ............................ | 175/40 |
| 5,377,771 A | 1/1995 | Wenzel | ............................ | 175/107 |
| 5,520,256 A | 5/1996 | Eddison | ............................ | 175/61 |
| 5,588,818 A | 12/1996 | Houmand et al. | ............................ | 418/5 |
| 5,704,838 A | 1/1998 | Teale | ............................ | 464/19 |
| 5,727,641 A | 3/1998 | Eddison et al. | ............................ | 175/76 |
| 5,738,358 A | 4/1998 | Kalsi et al. | ............................ | 277/544 |
| RE35,790 E | 5/1998 | Pustanyk et al. | ............................ | 175/40 |
| 5,911,284 A | 6/1999 | von Gynz-Rekowski | .... | 175/107 |
| 5,956,995 A | 9/1999 | Herben et al. | ............................ | 73/314 |
| 6,149,524 A * | 11/2000 | Jacob | ............................ | 464/15 |
| 6,349,778 B1 | 2/2002 | Blair et al. | ............................ | 175/73 |
| 6,350,202 B1 * | 2/2002 | Jacob et al. | ............................ | 464/145 |
| 6,827,160 B2 | 12/2004 | Blair et al. | ............................ | 175/107 |
| 6,949,025 B1 * | 9/2005 | Kraus et al. | ............................ | 464/19 |
| 7,186,182 B2 | 3/2007 | Wenzel et al. | ............................ | 464/19 |

* cited by examiner

*Primary Examiner* — Greg Binda
*Assistant Examiner* — Josh Skroupa
(74) *Attorney, Agent, or Firm* — Alfred J. Mangels

(57) ABSTRACT

A power transmission section particularly adapted for use in a downhole drilling system. A drive shaft is pivotally connected to input and output end connection members with pivot balls therebetween to allow pivoting of the shaft ends relative to the input and output end connection members. A plurality of ball segments having one spherically-curved surface are provided at each end of the drive shaft to engage with the input and output connection members and to transmit torque between the shaft ends and the input and output end connection members, regardless of the angular variation between the drive shaft longitudinal axis and the longitudinal axes of the input and output end connection members.

10 Claims, 9 Drawing Sheets

POWER TRANSMISSION LINE SECTION

BACKGROUND OF THE INVENTION

1. Field of the Invention

The present invention relates to a section of a rotatable drive line for transmitting torque between an input end and an output end. More particularly, the present invention relates to a power transmission line section in the form of an articulated drive shaft that can accept and transmit torque when the input and output ends of the line section are axially and angularly offset from each other.

2. Description of the Related Art

Power transmission sections in which the power input end of the transmission section is either intermittently or continuously axially or angularly offset from the power output end are utilized in numerous drive system applications. Examples of such applications include automotive drive trains and power transmission sections utilized in downhole drilling systems for drilling oil and gas wells.

In that regard, in downhole drilling systems utilized in drilling applications, progressive cavity pumps are provided and are operated in reverse, as motors, and are referred to as power sections of a drill string. The motors are commonly referred to as "mud motors" and are fluid-powered to provide output torque to drive a rotatable drill bit. Such motors have a rotor in the form of a helical stainless steel shaft that is rotatable within a stator. The stator is a formed, molded tubular elastomeric sleeve that is contained within a tubular metal casing. The inner surface of the stator is of helical form. The rotor is also of helical form and has a lobed cross section. The tubular stator has a lobed cross section with a dissimilar number of lobes as compared with the lobed cross section of the stator. Other forms of power sections can have a square outside cross section or a helical cross section. Power section types with improved torque output and horsepower are presently under development.

The mud motor of a downhole drilling system power section is located downhole, within a drill casing and near the drill bit. When drilling mud is pumped downhole under pressure to and through the mud motor, the result is that the downwardly moving drilling mud causes the rotor to rotate within the stator. The downstream end of the mud motor rotor thus rotates and simultaneously moves in an orbital path to provide orbital rotary motion to the input end of the power transmission section that is operatively connected at its output end to the drill bit. Thus, a universal-joint-type arrangement is needed to convert the orbital rotary input motion to pure rotation without orbital motion at the output end to drive the drill bit about a fixed axis of rotation.

Although a number of different articulating power transmission section arrangements have been disclosed and utilized in downhole drilling systems, many have been limited in their torque transmission capability and in their fatigue life. Additionally, the drilling mud that is utilized to drive the mud motor is of an abrasive nature, and unless they are adequately protected from the drilling mud the articulating ends of the power transmission section can quickly wear, requiring frequent drill string shutdowns for replacement of power transmission section components. There is presently a demand for downhole power sections capable of transmitting higher torque, and also capable of longer operating times before parts replacements are needed.

There is therefore a need for a power transmission section that is capable of transmitting a higher torque and that has a longer effective operating life than currently available power transmission section, and it is an object of the resent invention to provide such a power transmission section.

SUMMARY OF THE INVENTION

Briefly stated, in accordance with one aspect of the present invention, a rotational power transmission section is provided that includes an input component having a central axis for connection with a source of rotational power that provides input torque to the input component, and an output component having a central axis for connection with a driven member to provide output torque to the driven member. A connecting shaft having a longitudinal axis extends between and rotationally interconnects the input component with the output component for transmitting torque between the input component and the output component. The shaft is connected with each of the input component and the output component by a ball joint to allow swiveling motion between the shaft ends and each of the input component and the output component, and to allow angular deflection of the longitudinal axis of the shaft relative to the longitudinal axes of each of the input and output components.

A plurality of ball segments are circumferentially distributed about and are received in respective peripherally disposed outer end surfaces at each end of the shaft, and are also received in respective circumferentially disposed inner surfaces of each of the input and output components for transmitting rotary motion therebetween. The ball segments have a flat upper surface that faces a respective input and output member, a flat lower surface for contact with a first end surface of the shaft, a flat first side surface for contact with a second flat end surface of the shaft and that is angularly disposed relative to the first end surface of the shaft, and a convexly curved second side surface opposite to the flat first side surface for contact with a respective correspondingly curved inner surface of an end component.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
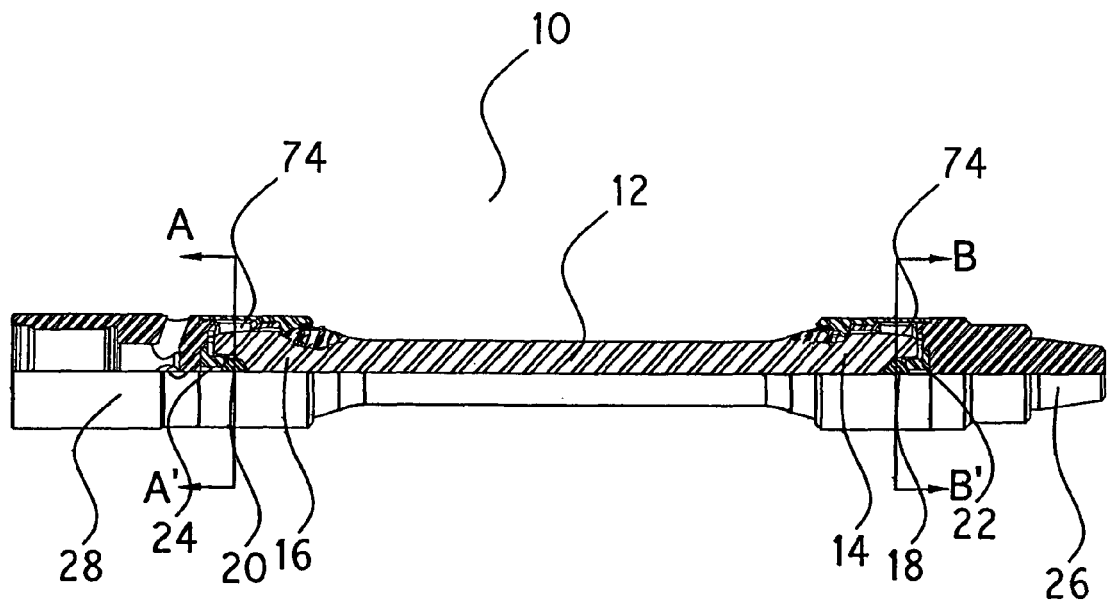
FIG. 1 is a longitudinal, quarter-sectional view of a power transmission section in accordance with an embodiment of the present invention.

Referring now to the drawings, and particularly to FIG. 1 thereof, there is shown a longitudinal quarter section through a power transmission section 10 in accordance with an embodiment of the present invention. Power transmission section 10 as shown is part of a downhole drive line for drilling an oil or gas well, and it includes a drive shaft 12 having similarly configured ends including an input end 14 and an output end 16. Ends 14 and 16 of drive shaft 12 each include a centrally positioned ball recess that receives a respective pivot ball 18, 20. Axially opposite to ends 14 and 16 of drive shaft 12 are respective ball seats 22 and 24 that receive and contact an opposite ball surface region of respective pivot balls 18 and 20. Ball seats 22 and 24 are received in respective end adapters 26 and 28. End adapter 26 is at the power input end of power transmission section 10, and when it is part of a downhole drive arrangement it connects with an upstream drive connection to a power section (not shown). Similarly, end adapter 28 is at the power output end of power transmission section 10, and when it is part of a downhole drive arrangement it connects with a suitable bearing pack assembly (not shown) connected to the drill bit. That arrangement is called a bottom hole assembly. When power transmission section 10 is utilized as a drive line component in other drive systems, the forms of the connection arrangements at each of end adapters 26 and 28 can be differently configured, depending upon the configurations of the particular drive line components to which they are to be connected.

Figure 2:
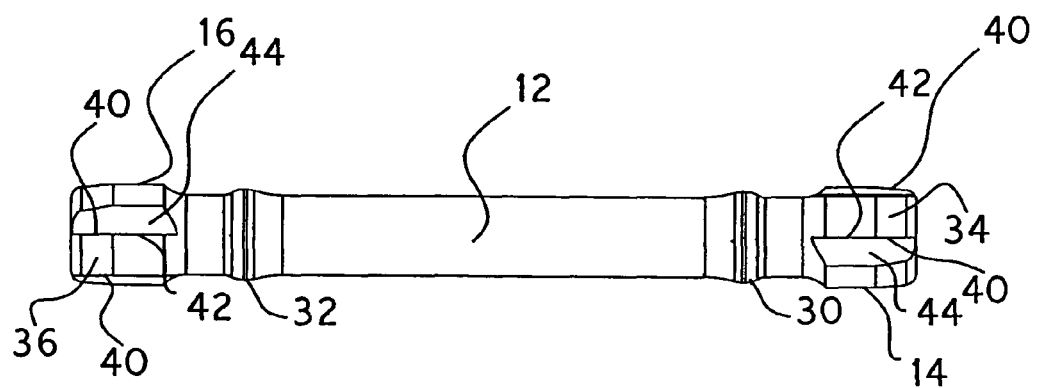
FIG. 2 is a side view of the power transmission section shaft.
Figure 3:
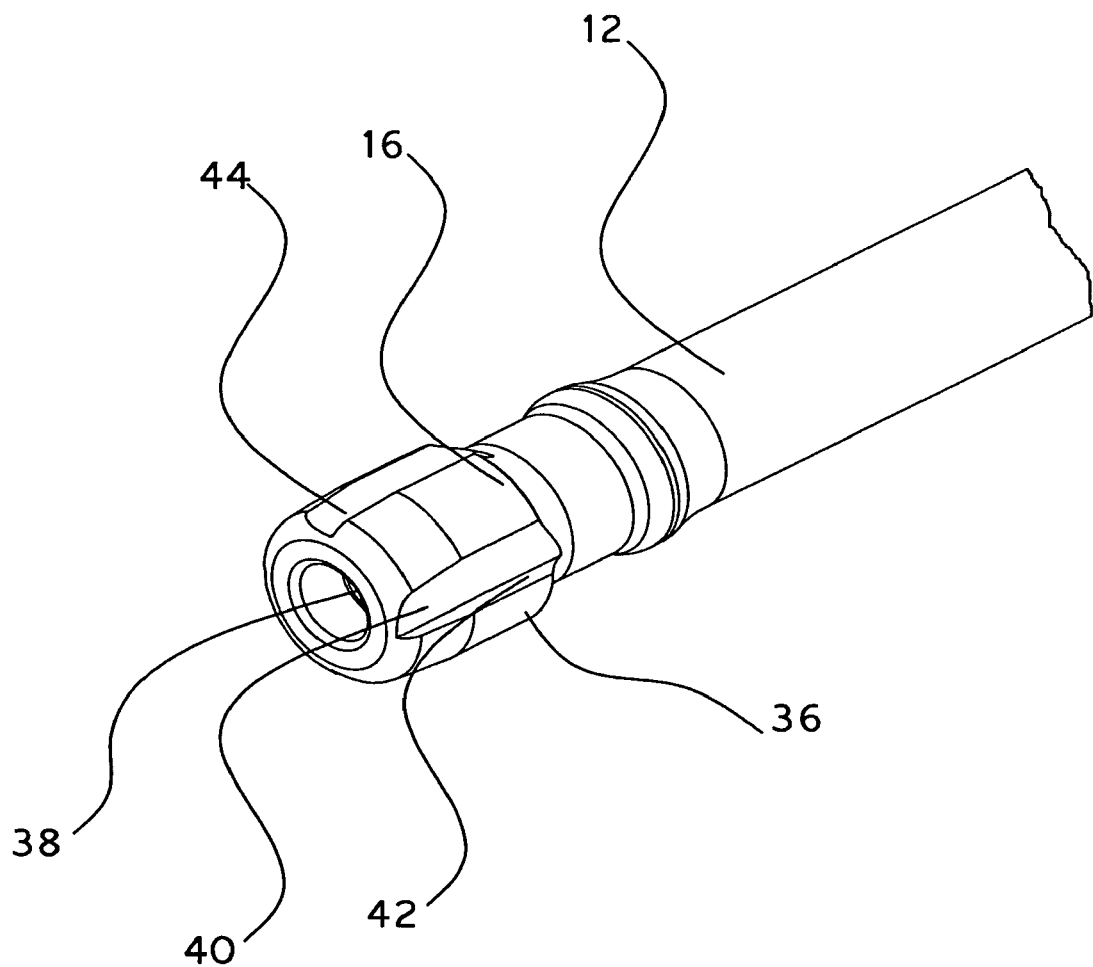
FIG. 3 is a perspective view of an end of the power transmission section shaft shown in FIG. 2.

Drive shaft 12 is shown in a side view in FIG. 2, and output end 16 of drive shaft 12 is shown in perspective in FIG. 3. The input end 14 of drive shaft 12 has the same configuration as is shown in FIG. 3 for output end 16. Drive shaft 12 is an elongated, generally cylindrical member that can be a solid steel component, or it can be a tubular component, depending upon the torque it is required to transmit and other possible design criteria, such as weight, when it is utilized in a particular type of drive system. Spaced inwardly of each end 14, 16 of shaft 12 is a respective outwardly extending annular ridge 30, 32 that is adjacent to but spaced from a respective enlarged end drive element 34, 36.

The outermost axial ends of drive shaft 12 include centrally-positioned, semi-spherical ball recesses, only one of which, ball recess 38, is shown in FIG. 3, that serve to engage the outer surfaces of respective pivot balls 18, 20 to allow drive shaft 12 to pivot relative to the longitudinal axes of each of end adapters 26, 28. Each of ends 14, 16 also includes a plurality of equally circumferentially disposed, axially-extending recesses 40 that are defined by a substantially radially-extending flat drive surface 42 and an intersecting, angularly disposed flat drive surface 44 that together form a V-shaped axially extending recess 40 when viewed in the direction of ball recess 38.

Figure 4:
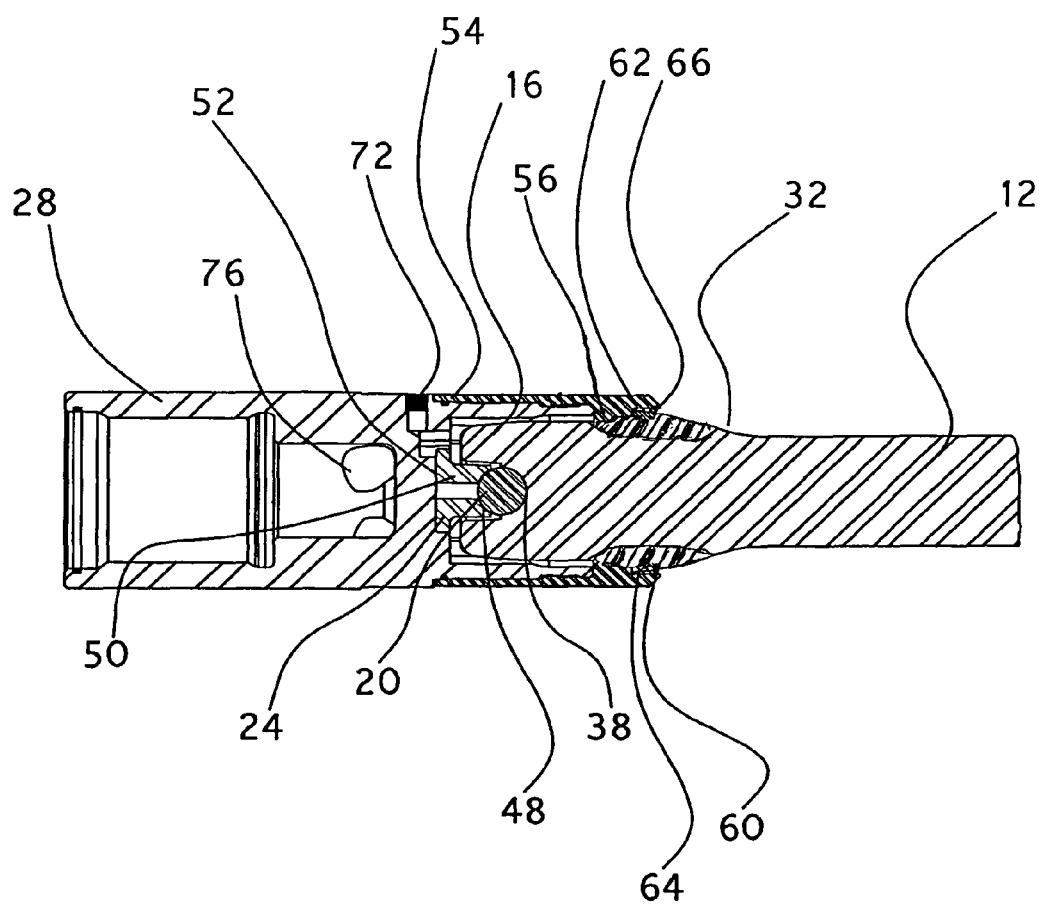
FIG. 4 is an enlarged cross sectional view of the output end of the power transmission section shown in FIG. 1.

The interconnection between drive shaft 12 and end adapter 28 at the output end of the power transmission section is shown in cross section in FIG. 4. The same structural interconnection and the same forms of components are also provided at the input end of the power transmission section, and except for the configurations of the connections of end adapters 26 and 28 with upstream and downstream components of the power transmission line, the following description of the elements at the output end and their functional relationships are to be understood to also apply to the input end of the power transmission section. As shown in FIG. 4, pivot ball 20 is situated partially within ball recess 38 of drive shaft 12 and partially within ball seat 24, the latter of which includes a tubular body 46 that terminates at its innermost end in a spherically-shaped recess 48 to receive a portion of the outer surface of pivot ball 20. A radially-extending flange 50 at the outermost end of ball seat 24 is received in a circular recess 52 provided at an interior radial wall of end adapter 28.

Threadedly connected to end adapter 28 and overlying shaft output end 16 is an annular end cap 54 of tubular form. End cap 54 includes an inwardly-extending annular ridge 56 between each of the outer ends thereof, against which an outer end of an annular elastomeric sealing sleeve 60 rests. Sealing sleeve 60 is of elongated elliptical form and extends along a portion of the outer surface of drive shaft 12 from annular ridge 32 of drive shaft 12 toward the outer end of the drive shaft. A retaining clamp 62 surrounds sealing sleeve 60 at a point between annular ridge 32 of drive shaft 12 and annular ridge 56 of end cap 54 to radially inwardly press against and thereby compress that portion of sealing sleeve 60 to securely retain it in position against the outer surface of drive shaft 12, and also to block the passage of drilling mud into the interior of annular end cap 54 between drive shaft 12 and sealing sleeve 60. When the disclosed arrangement is in the assembled form as it is shown in FIG. 4, the downstream or longitudinally outermost end of sealing sleeve 60 is tightly engaged by inner ridge 56 of end cap 54. As a result, a secondary seal is provided between end cap 54 and drive shaft 12 to block any drilling mud that flows around the outside of the power transmission section from entering into the interior of end cap 54, and thereby serves to protect pivot ball 20 and other internal components within end cap 54 against the entry of any possibly abrasive materials. A retaining ring 64 is positioned between the outer surface of sealing sleeve 60 and an annular recess 66 in the inner surface of end cap 54.

Figure 5:
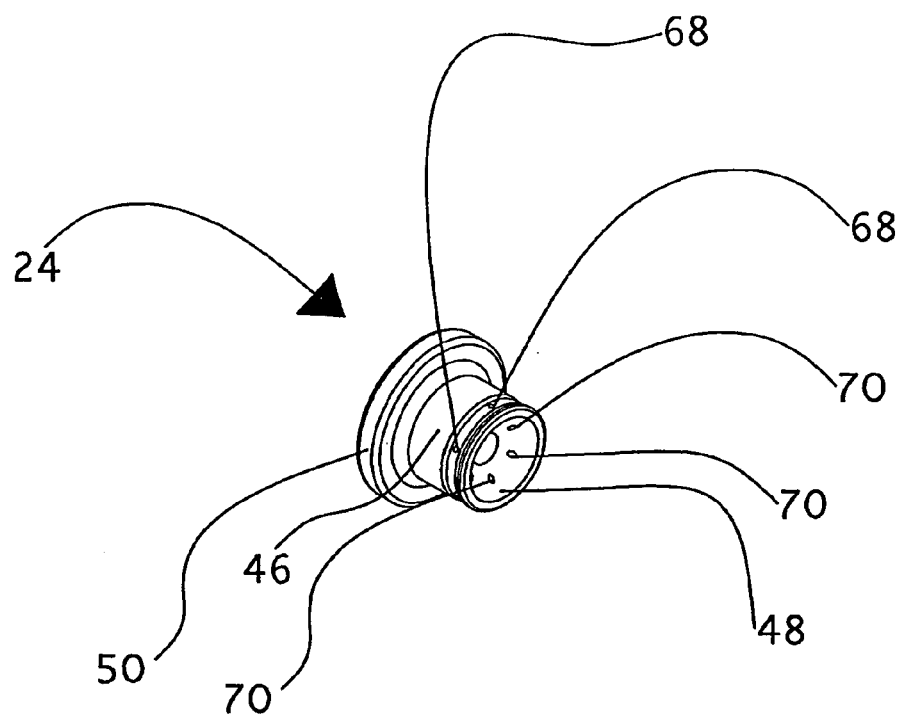
FIG. 5 is a front perspective view of the pivot ball seat shown in FIG. 4.

Ball seat 24 is shown in a perspective view in FIG. 5. A number of lubricant passageways are provided in ball seat 24 and extend from lubricant openings 68 in the outer surface of tubular body 46, inwardly to respective lubricant openings 70 at spherical recess 48, in order to conduct lubricant from the outer surface of tubular body 46, through tubular body 46, to the outer surface of pivot ball 48. Lubricant is introduced through lubricant port 72 (see FIG. 4) in end adapter 28 to flow into the interior space within end adapter 28 and around the outer surface of tubular body 46, to flow into and through lubricant openings 68 and to lubricant openings 70 to provide lubricant to pivot ball 48. A suitable closure plug (not shown) can be provided to close lubricant port 72 after a sufficient quantity of lubricant has been introduced.

Figure 6:
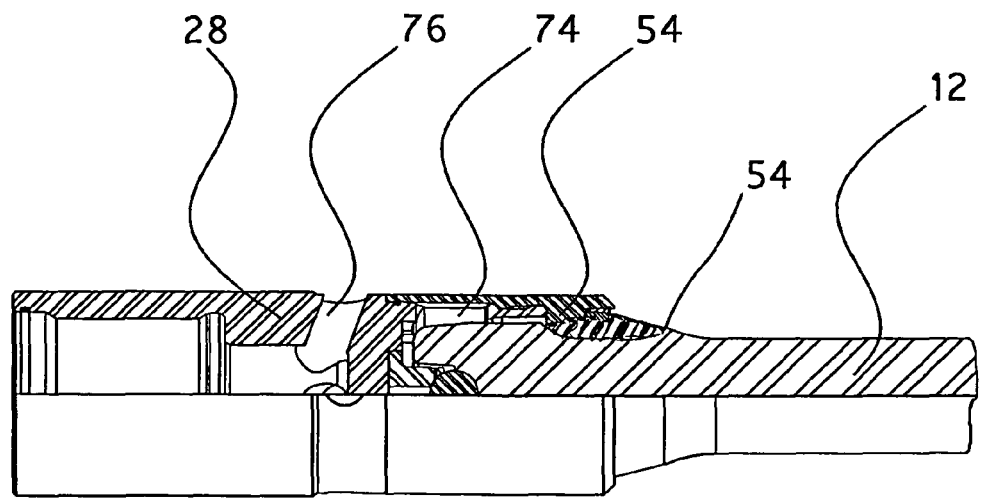
FIG. 6 is fragmentary, longitudinal quarter-sectional view of the output end of the power transmission section shown in FIG. 1, but rotated by approximately 30° from the representation shown in FIG. 4.

FIG. 6 shows a quarter cross sectional view similar to that of FIG. 4, except that end adapter 28 has been rotated about 30° relative to the positions of the parts as they are shown in FIG. 4. In FIG. 6, one of several circumferentially disposed ball segments 74 is visible, each of which ball segments is positioned in contact with a shaft end recess 40 and also in contact with a shaped inner surface of end adapter 28. Ball segments 74 serve to transmit torque between rotating drive shaft 12 and end adapter 28, to provide an output torque from the power transmission section at end adapter 28. Input torque to shaft 12 is transmitted from end adapter 26 (see FIG. 1) through correspondingly-shaped ball segments 74 to the adjacent input end 14 of drive shaft 12. As shown in FIGS. 4 and 6, end adapter 28 includes several passageways 76 that extend inwardly from the outer surface of end adapter 28 to the interior thereof for conveying drilling mud toward a drill bit when the device is utilized in a downhole oil or gas well drilling system. When not utilized in such drilling systems passageways 76 can be omitted.

Figure 7:
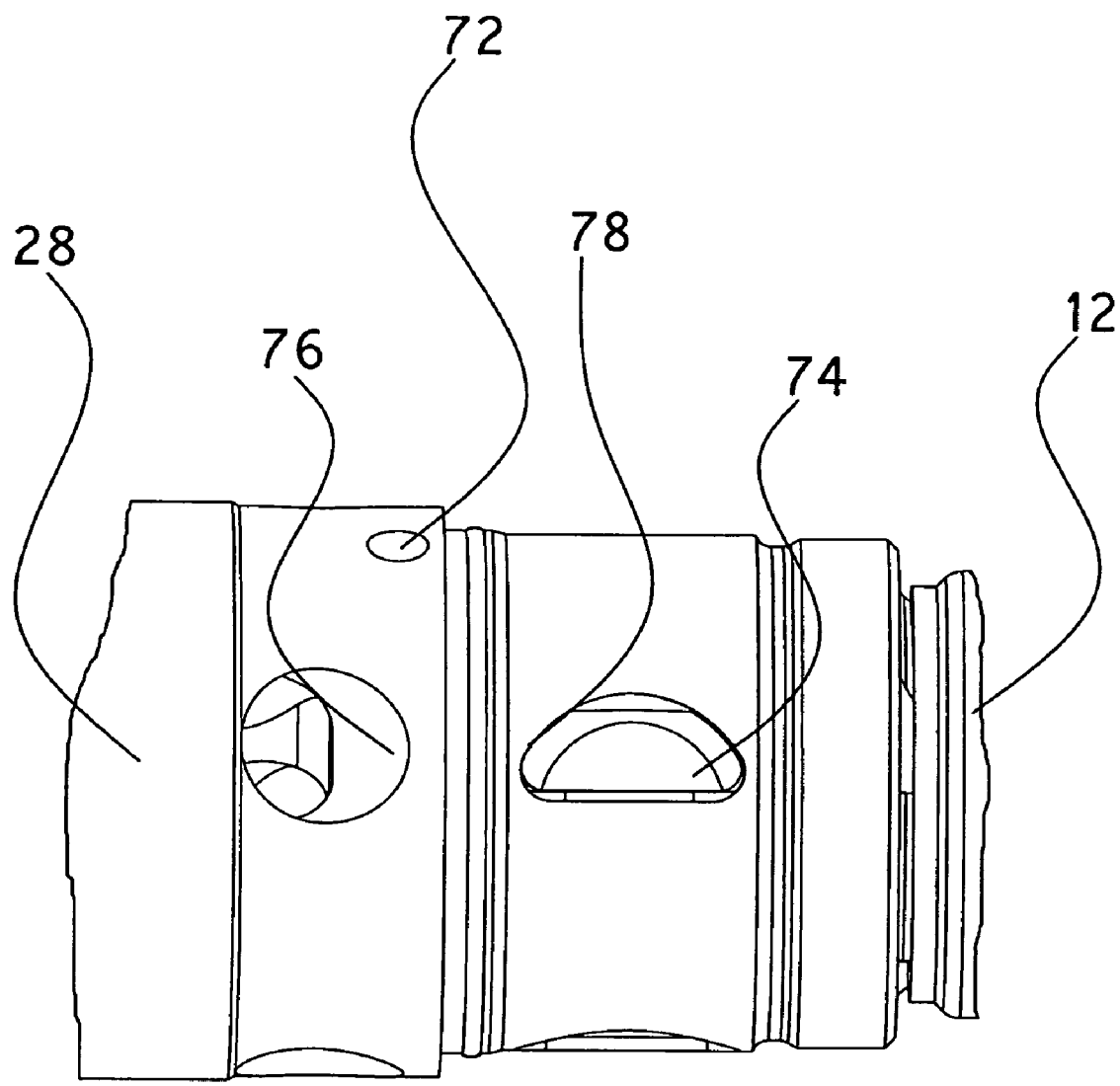
FIG. 7 is an enlarged, fragmentary side view of the output end of the power transmission section of FIG. 6, with the annular end cap removed.
Figure 8:
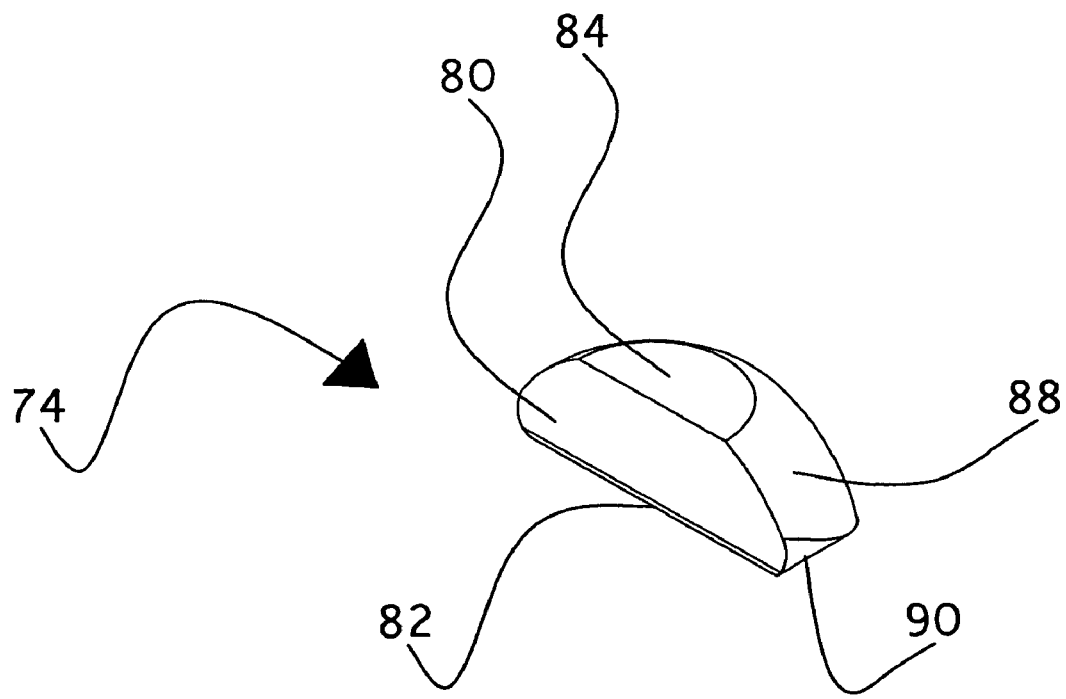
FIG. 8 is a perspective view of a ball segment.
Figure 9:
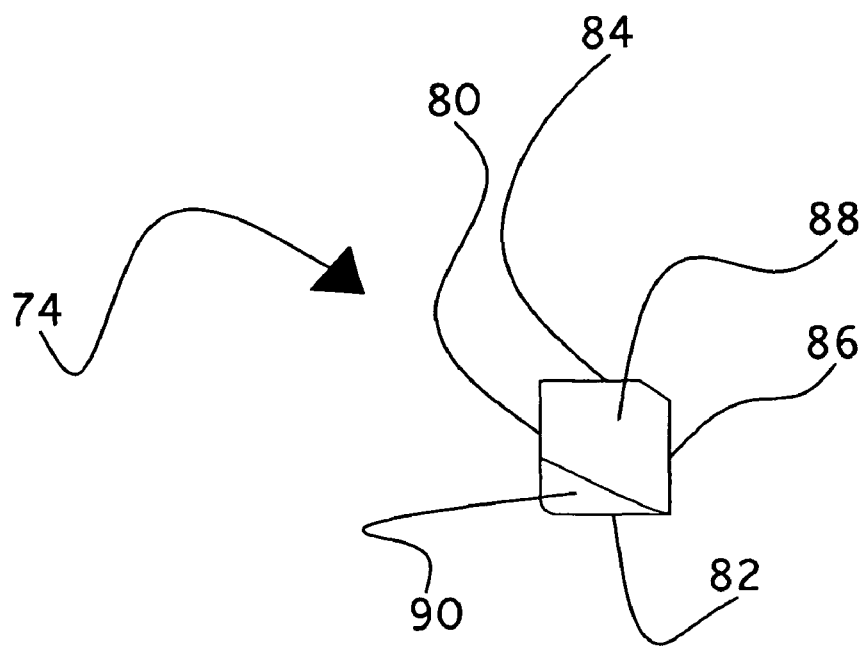
FIG. 9 is a front end view of the ball segment shown in FIG. 8.
Figure 10:
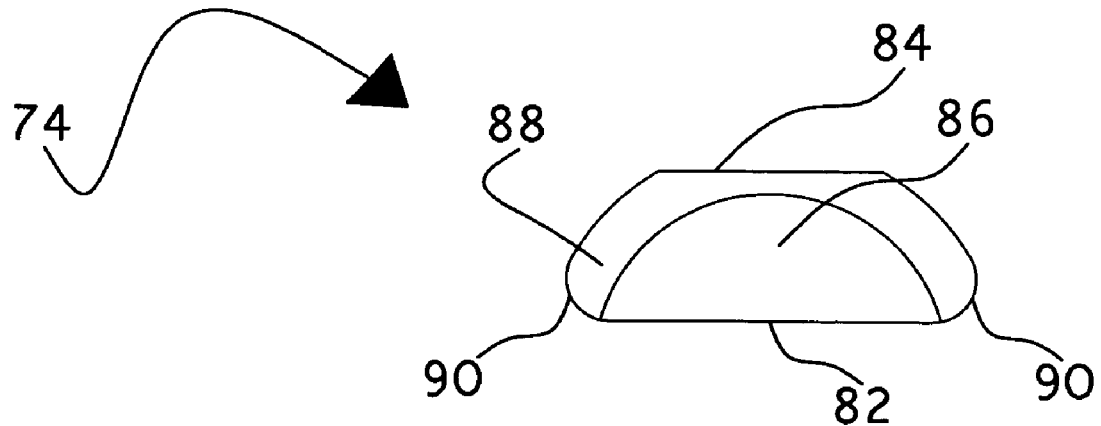
FIG. 10 is a right side view of the ball segment shown in FIG. 8.
Figure 11:
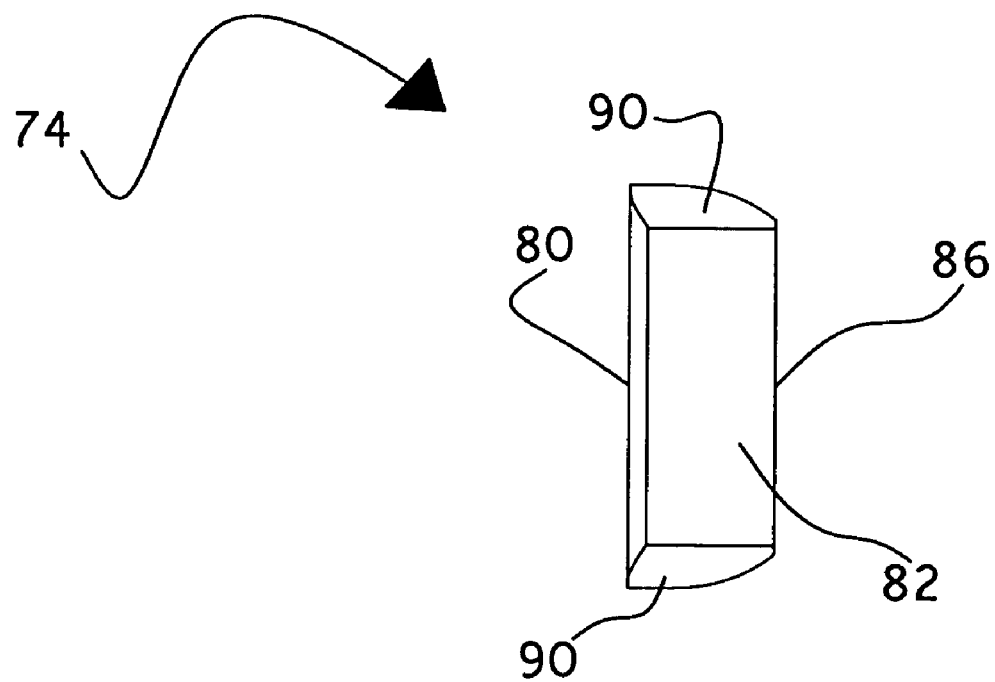
FIG. 11 is a bottom view of the ball segment shown in FIG. 8.
Figure 12:
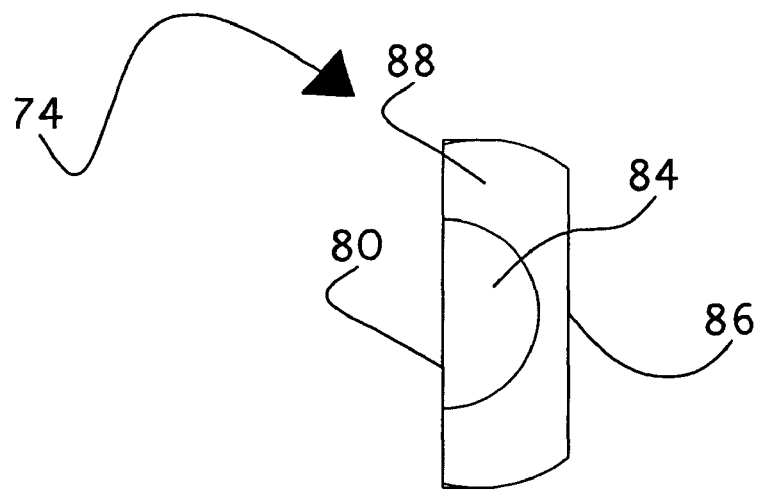
FIG. 12 is a top view of the ball segment shown in FIG. 8.

FIG. 7 shows a fragmentary side view of end adapter 28 with end cap 54 removed. Both the opening of lubricant port 72 and the openings of inwardly-directed passageways 76 are visible. Also visible is a ball segment 74 that can be easily inserted into and removed from end adapter 28 through peripheral opening 78 in end adapter 28, as may be needed for replacement purposes.

FIGS. 8 through 12 show various views of a ball segment 74, several of which are interposed between the ends of drive shaft 12 and end adapters 26 and 28. Ball segments 74 permit the continuous transmission of torque by power transmission section 10, regardless of the angle of inclination of the longitudinal axis of drive shaft 12 relative to the axes of end adapters 26 and 28. Ball segment 74 includes a first flat face 80 that is adapted to be positioned against and to contact and be rotationally carried by radial drive surface 42 of shaft end recess 40 of drive shaft 12 as the drive shaft rotates. A second flat face 82 of ball segment 74 forms the bottom surface of the ball segment and is perpendicular to first flat face 80. The angle defined between first flat face 82 and second flat face 80 is preferably substantially 90°, although angles of between about 80° and about 100° can also be utilized.

Second flat face 82 is adapted to be positioned against and to contact angular drive surface 44 of a shaft end recess 40 of drive shaft 12. As will be appreciated, rotation of the output end of drive shaft 12 is in the direction in which it will carry ball segments 74 with it. A third flat face 84 defines the top surface of ball segment 74 and is perpendicular to first flat face 80 and parallel to second flat face 82. A fourth flat face 86 (see FIGS. 9 through 12) is positioned opposite first flat face 80 and is perpendicular to second flat face 82. Extending between and terminating at each of flat faces 80, 82, 84, and 86 is a convexly-curved outer face 88 that is a portion of a spherically curved surface having a predetermined radius of curvature. Finally, chamfer-like, convexly-curved end surfaces 90 are provided at each of the opposite longitudinal ends of ball segment 74 and are bounded by flat faces 80 and 82 and curved outer face 88.

Figure 13:
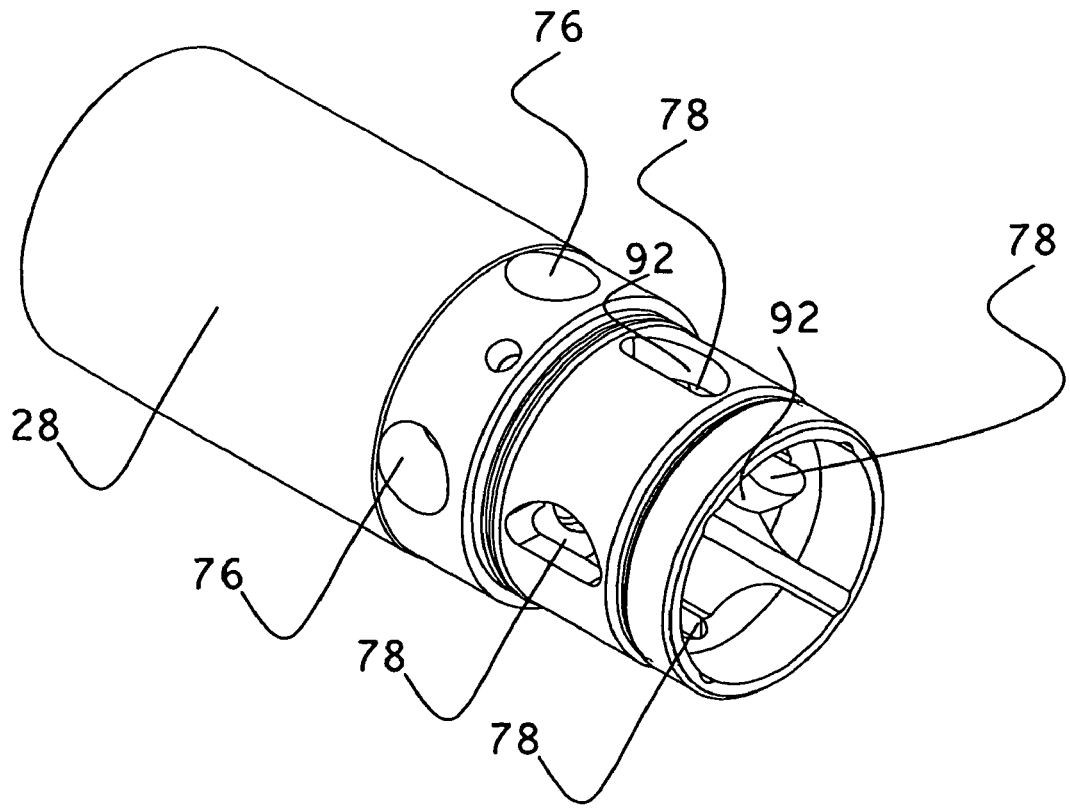
FIG. 13 is a perspective view of an end of the end adapter of the power transmission section shown in FIG. 1.

FIG. 13 is a perspective end view of the inner end of output end adapter 28, showing the positions of inwardly-extending passageways 76, of openings 78 for ball segments 74, of lubricant port 72, and of inner contact surfaces 92 that correspond in number with and that are contacted by contact surfaces 88 of ball segments 74 when the power transmission line section is in assembled condition. Contact surfaces 92 are concavely-curved surfaces that are portions of spherically-curved surfaces having substantially the same radii of curvature as the radii of curvature of contact surfaces 88 of ball segments 74. The inner end of input end adapter 26 has the same inner configuration as that of output end adapter 28. However, input end adapter 26 does not include inwardly-directed passageways that correspond with passageways 76 of output end adapter 28.

Figure 14:
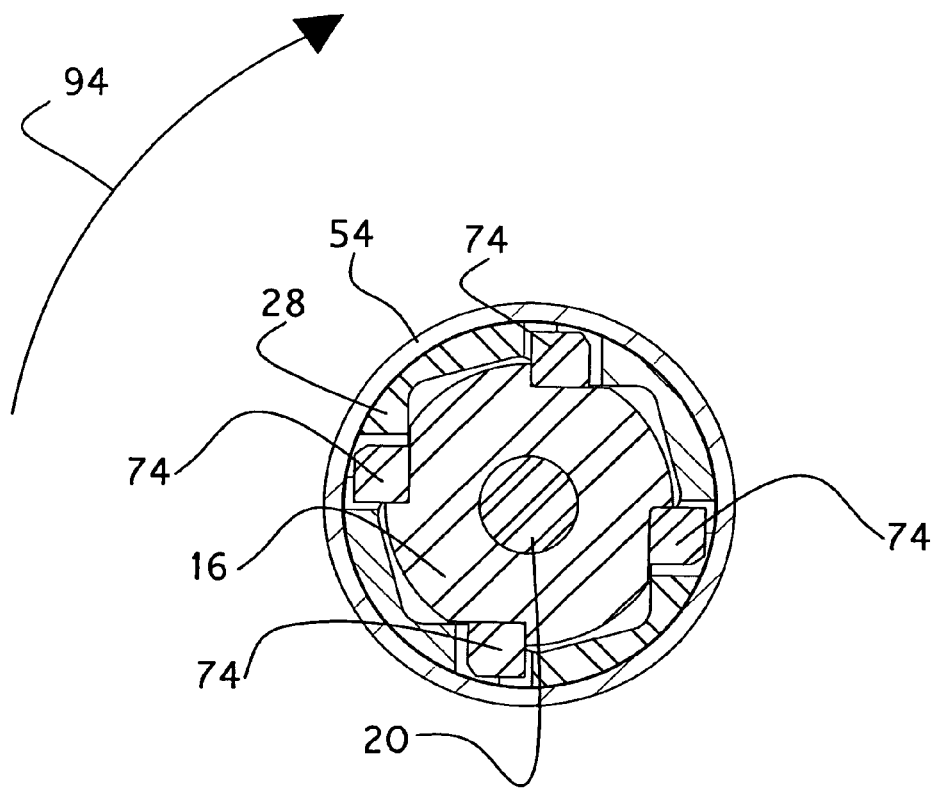
FIG. 14 is a cross sectional view taken along the lines A-A and B-B of FIG. 1.

The contacting and positional relationships between end adapter 28, end cap 54, shaft output end 16, ball segments 74, and pivot ball 20 are shown in FIG. 14, which is a cross sectional view taken along line A-A of FIG. 1. The same relative relationships exist at the shaft input end 14 when viewed along line B-B of FIG. 1. The direction of rotation is represented by arrow 94 in FIG. 14.

Figure 15:
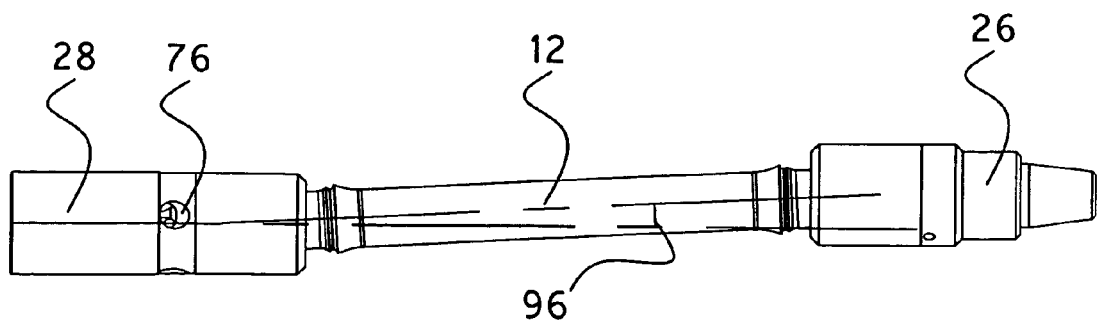
FIG. 15 is a side view of the power transmission section shown in FIG. 1 without the seals, to show the power transmission section in an off-center drive position.

FIG. 15 illustrates the degree of possible lateral offset between the longitudinal axes of input end adapter 26 and output end adapter 28, whereby the power transmission line 10 in accordance with the present invention is capable of continuously transmitting high torque, regardless of the degree of lateral offset. The present invention allows a lateral offset of the longitudinal axes of input end adapter 26 and output end adapter 28 of about 3.0 in., and an angular offset 96 of the longitudinal axis of drive shaft 12 relative to the longitudinal axes of each of input end adapter 26 and of output end adapter 28 of about 3-4°. Other lateral offsets can also be provided with the components included in the present design.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A rotational power transmission line section comprising:
   a) an input component for connection with a source of rotational power that provides torque, the input component having a central axis, and an output component for connection with a driven member to provide torque to the driven member, the output component having a central axis;
   b) a connecting drive shaft having a longitudinal axis and extending between and rotationally interconnecting the input component with the output component for transmitting torque between the input component and the output component, wherein the drive shaft is connected with each of the input component and the output component by a ball joint to allow swiveling motion between the drive shaft and each of the input component and the output component and to allow angular deflection of the longitudinal axis of the drive shaft relative to the longitudinal axes of each of the input and output components; and
   c) a plurality of ball segments circumferentially distributed about and received in respective V-shaped, axially-extending, peripherally-disposed outer end regions at each end of the drive shaft and received in respective circumferentially disposed inner surfaces of each of the input and output components for transmitting rotary motion between the drive shaft and the input and output components, wherein the ball segments each have a flat upper surface that faces an inner surface of a respective input or output member, a flat lower surface for contact with a first flat, axially-extending surface of a respective ball-segment-receiving region at an axial end of the drive shaft, a flat first side surface for contact with a second flat, axially-extending surface of a respective ball-segment-receiving region at an axial end of the drive shaft and that is angularly disposed relative to the first end surface of the drive shaft, and a convexly-curved second side surface opposite to the flat first side surface for surface-to-surface contact with a respective concavely-curved inner surface of an end component.

2. A transmission line section in accordance with claim 1, wherein the convexly-curved second side surface of the ball segment and the concavely-curved inner surface of the end component each have a spherical curvature.

3. A transmission line section in accordance with claim 2, wherein a radius of curvature of the convexly-curved surface and a radius of curvature of the concavely-curved surface each have substantially the same magnitude radius of curvature.

4. A transmission line section in accordance with claim 1, wherein the drive shaft includes a pair of radially-outwardly-extending annular ridges that are spaced inwardly of and are adjacent to respective ends of the drive shaft, and tubular elastomeric sealing sleeves overlying respective drive shaft annular ridges and extending along the drive shaft outer surface to a sealing sleeve outer axial end positioned inwardly of the drive shaft outer end, the sealing sleeves positioned between the drive shaft outer surface and the respective inner surfaces of the input and output components for sealing engagement with the drive shaft outer surface.

5. A transmission line section in accordance with claim 4, wherein the sealing member includes a radially thickened intermediate section that axially abuts a radially-inwardly extending annular ridge formed on the inner surfaces of each of the respective input and output components.

6. A transmission line section in accordance with claim 5, including an annular clamping member surrounding the sealing member at an axial position between the radially-outwardly-extending ridge of the drive shaft and axially inner ends of the input and output members for retaining the sealing member on the drive shaft.

7. A transmission line section in accordance with claim 5, wherein the sealing member is of elliptical cross-sectional shape.

8. A transmission line section in accordance with claim 1, wherein the output component includes a plurality of inwardly-directed passageways that extend from an outer surface of the output component to an inner region within the output component that is downstream of and separated from the ball joint for conveying drilling mud to a downstream drill bit.

9. A transmission line section in accordance with claim 1, wherein a respective ball seat is carried within each of the input and output components for engagement with a surface of a pivot ball positioned between the ball seat and an end of the drive shaft, wherein the ball seat includes passageways for conducting lubricant from respective inner regions of the input and output components to ball seat surfaces that are in contact with the respective pivot balls.

10. A transmission line section in accordance with claim 9, wherein the inner regions are sealed from the entry of externally-carried drilling mud.

* * * * *